United States Patent
Toomi et al.

(10) Patent No.: US 8,562,235 B2
(45) Date of Patent: Oct. 22, 2013

(54) INK COMPOSITION FOR AQUEOUS INK BALL POINT PEN AND AQUEOUS INK BALL POINT PEN

(75) Inventors: Hideaki Toomi, Yokohama (JP); Masanao Yano, Yokohama (JP); Takeshi Hayakawa, Yokohama (JP); Syuji Ichikawa, Yokohama (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 0 days.

(21) Appl. No.: 13/514,766

(22) PCT Filed: Dec. 2, 2010

(86) PCT No.: PCT/JP2010/071576
§ 371 (c)(1),
(2), (4) Date: Jun. 8, 2012

(87) PCT Pub. No.: WO2011/070966
PCT Pub. Date: Jun. 16, 2011

(65) Prior Publication Data
US 2012/0251222 A1 Oct. 4, 2012

(30) Foreign Application Priority Data
Dec. 8, 2009 (JP) .................................. 2009-278763

(51) Int. Cl.
*B43K 7/00* (2006.01)
(52) U.S. Cl.
USPC ............................ 401/209; 523/160; 523/161
(58) Field of Classification Search
USPC ........... 401/209; 523/160, 161, 210; 106/400, 106/20 R, 20 D
See application file for complete search history.

(56) References Cited

U.S. PATENT DOCUMENTS

| 6,548,174 | B2 * | 4/2003 | Nakajima et al. ............. 428/413 |
| 6,609,934 | B2 * | 8/2003 | Chen et al. ............... 439/607.48 |
| 8,202,327 | B2 * | 6/2012 | Higashi et al. ................. 8/637.1 |
| 8,440,745 | B2 * | 5/2013 | Kotera et al. ................. 523/160 |
| 2011/0008095 | A1 | 1/2011 | Fujita |

FOREIGN PATENT DOCUMENTS

| JP | 2005-132884 A | 5/2005 |
| JP | 2006-7766 A | 1/2006 |
| JP | 2006-206786 A | 8/2006 |
| JP | 2008-280440 A | 11/2008 |
| JP | 2009-227954 A | 10/2009 |
| JP | 2010-132822 A | 6/2010 |

OTHER PUBLICATIONS

Notification of Transmittal of Translation of the International Preliminary Report on Patentability (Form PCT/IB/338) of International Patent Application No. PCT/JP2010/071576, dated Jul. 19, 2012 with Forms PCT/IB/373 and PCT/ISA1237.

* cited by examiner

*Primary Examiner* — David Walczak
(74) *Attorney, Agent, or Firm* — Westerman, Hattori, Daniels & Adrian, LLP

(57) ABSTRACT

An ink composition for an aqueous ink ball point pen with which a sufficiently high line intensity is obtained even when a thermochromic microcapsule pigment having a small average particle diameter is used and which is excellent in storage stability and a writing performance is provided with such a constitution that it contains at least a microcapsule pigment which has an average particle diameter of 0.1 to 1.0 μm and in which a wall film is formed by an amino resin and a chemical substance which is a polymer comprising ketone as a main chain and has an acidic functional group in the chemical structure and which has an acid value of 3 to 40 (mgKOH/g).

6 Claims, No Drawings

INK COMPOSITION FOR AQUEOUS INK BALL POINT PEN AND AQUEOUS INK BALL POINT PEN

TECHNICAL FIELD

The present invention relates to an ink composition for an aqueous ink ball point pen containing a microcapsule pigment and an aqueous ink ball point pen, more specifically to an ink composition for an aqueous ink ball point pen with which a sufficiently high line intensity is obtained even when a thermochromic microcapsule pigment having a small average particle diameter is used and which is excellent in storage stability and a writing performance of the ink and an aqueous ink ball point pen.

BACKGROUND ART

A lot of ink compositions prepared by using thermochromic microcapsule pigments making use of a coloring and decoloring mechanism of a leuco dye have so far been known.

Known are, for example, an aqueous ink composition for reversibly thermochromic writing instruments containing at least water and a reversibly thermochromic microcapsule pigment involving a reversibly thermochromic composition comprising (a) an electron-donative coloring organic compound which is a leuco dye, (b) an electron-accepting compound which is a developer and (c) a reaction medium which is a discoloration temperature controlling agent for determining a temperature causing the color reaction between both described above, wherein an average particle diameter of the reversibly thermochromic microcapsule pigment described above falls in a range of 2.5 to 4.0 µm, and the particles of 2.0 µm or less account for 30% by volume or less based on the whole microcapsule pigment (refer to, for example, patent document 1) and an aqueous ink composition for reversibly thermochromic writing instruments comprising water, a reversibly thermochromic microcapsule pigment involving a reversibly thermochromic composition comprising (a) an electron-donative coloring organic compound which is a leuco dye, (b) an electron-accepting compound which is a developer and (c) a reaction medium which is a discoloration temperature controlling agent for determining a temperature causing the color reaction between both described above, a polymer flocculant, a comb type polymer dispersant having a carboxyl group in a side chain and a water-soluble resin, wherein an average value of maximum outer diameters of the microcapsule pigment described above is 0.5 to 5.0 µm (refer to, for example, patent document 2).

In general, however, the microcapsule pigment described above is decreased in color intensity as an average particle diameter thereof is smaller, which is undesirable. That fact is described in a paragraph 0023 of patent document 1 described above such that it is difficult to exert color developability at high intensity in the microcapsule pigment having an average particle diameter of less than 2.5 µm and that the particles of 2.0 µm or less account for 30% by volume or less, more preferably 10% by volume or less based on the whole microcapsule pigment. Also, it is described in patent document 2 described above that an average value of maximum outer diameters of the microcapsule pigment is 0.5 to 5.0 µm, but observing the respective examples, the microcapsule pigment of 2.3 to 2.5 µm is used. This is attributable to that a capsule thickness in the microcapsule pigment is relatively increased.

On the other hand, when the above microcapsule pigment is used for an aqueous ink ball point pen, the pigment having a small average particle diameter is preferably used in terms of the writing property and storage stability of the ink. However, the existing situation is that inks containing a thermochromic microcapsule pigment and ball point pens which satisfy the various performances have not so far been obtained because of the reasons described above.

Prior Art Documents

Patent Documents

Patent document 1: Japanese Patent Application Laid-Open No. 2008-280440 (claims, examples and others)

Patent document 2: Japanese Patent Application Laid-Open No. 2009-227954 (claims, examples and others)

OUTLINE OF THE INVENTION

Problems to be Solved by the Invention

In light of the problems of the conventional art and the existing situation each described above, the present invention tries to solve them, and an object thereof is to provide an ink composition for an aqueous ink ball point pen with which a sufficiently high line intensity is obtained even when a thermochromic microcapsule pigment having such a small particle diameter as an average particle diameter of 0.1 to 1.0 µm is used and which is excellent in storage stability and writing performances and an aqueous ink ball point pen.

Means for Solving the Problems

In light of the problems and the like described above, intense researches repeated by the present inventors have resulted in finding that an ink composition for an aqueous ink ball point pen and an aqueous ink ball point pen which meet the object described above can be obtained by containing at least a microcapsule pigment which has an average particle diameter of 0.1 to 1.0 µm and which is formed by a wall film having specific physical properties and a chemical substance having specific physical properties, and thus the present invention has come to be completed.

That is, the present invention comprises the following items (1) to (4).

(1) An ink composition for an aqueous ink ball point pen containing at least a microcapsule pigment which has an average particle diameter of 0.1 to 1.0 µm and in which a wall film is formed by an amino resin and a chemical substance which is a polymer comprising ketone as a main chain and has an acidic functional group in the chemical structure and which has an acid value of 3 to 40 (mgKOH/g).

(2) The ink composition for an aqueous ink ball point pen as described in the above item (1), further containing polyoxyethylene aliphatic amine (an aliphatic group has 10 to 20 carbon atoms).

(3) The ink composition for an aqueous ink ball point pen as described in the above item (2), wherein polyoxyethylene in the polyoxyethylene aliphatic amine described above has an addition mole number of 10 to 50.

(4) An aqueous ink ball point pen filled with the ink composition for an aqueous ink ball point pen as described in any of the above items (1) to (3).

Effect of the Invention

According to the present invention, provided are an ink composition for an aqueous ink ball point pen with which a sufficiently high line intensity is obtained even when a thermochromic microcapsule pigment having such a small particle diameter as an average particle diameter of 0.1 to 1.0 µm is used and which is excellent in storage stability and a writing performance and an aqueous ink ball point pen.

MODE FOR CARRYING OUT THE INVENTION

The embodiment of the present invention shall be explained below in detail.

The ink composition of the present invention for an aqueous ink ball point pen is characterized by containing at least a microcapsule pigment which has an average particle diameter of 0.1 to 1.0 µm and in which a wall film is formed by an amino resin and a chemical substance which is a polymer comprising ketone as a main chain and has an acidic functional group in a chemical structure and which has an acid value of 3 to 40 (mgKOH/g).

The microcapsule pigment used in the present invention is a pigment which has an average particle diameter of 0.1 to 1.0 µm and in which a wall film is formed by an amino resin, and a thermochromic composition constituted from at least a leuco dye, a developer and a discoloration temperature controlling agent is involved therein.

The leuco dye which can be used shall not specifically be restricted as long as it is an electron donative dye and has a function of a coloring agent. To be specific, leuco dyes of a triphenylmethane base, a spiropyran base, a fluoran base, a diphenylmethane base, a rhodamine lactam base, an indolyl phthalide base, a leuco auramine base and the like which have so far been publicly known can be used alone (single kind) or in a mixture of two or more kinds thereof (hereinafter referred to merely as "at least one kind") in terms of obtaining an ink which is excellent in a coloring characteristic.

To be specific, it includes 6-(dimethylamino)-3,3-bis[4-(dimethylamino)phenyl]-1-(3H)-isobenzofuranone, 3,3-bis(p-(dimethylaminophenyl)-6-dimethylaminophthalide, 3-(4-(diethylaminophenyl)-3-(1-ethyl-2-methylindole-3-yl) phthalide, 3-(4-(diethylamino-2-ethoxyphenyl)-3-(1-ethyl-2-methylindole-3-yl)-4-azaphthalide, 1,3-dimethyl-6-diethylaminofluoran, 2-chloro-3-methyl-6-dimethylaminofluoran, 3-dibutylamino-6-methyl-7-anilinofluoran, 3-diethylamino-6-methyl-7-anilinofluoran, 3-diethylamino-6-methyl-7-xylidinofluoran, 2-(2-chloroanilino)-6-dibutylaminofluoran, 3,6-dimethyoxyfluoran, 3,6-di-n-butyoxyfluoran, 1,2-benz-6-diethylaminofluoran, 1,2-benz-6-dibutylaminofluoran, 1,2-benz-6-ethylisoamylaminofluoran, 2-methyl-6-(N-p-tolyl-N-ethylamino)fluoran, 2-(N-phenyl-N-methylamino)-6-(N-p-tolylN-ethylamino)fluoran, 2-(3'-trifluoromethylanilino)-6-diethylaminofluoran, 3-chloro-6-cyclohexylaminofluoran, 2-methyl-6-cyclohexylaminofluoran, 3-methoxy-4-dodecoxystyrinoquinoline and the like. At least one of them can be used.

Further, pyridine base compounds, quinazoline base compounds, bisquinazoline base compounds and the like which develop a yellow color to a red color can be used as well.

The above leuco dyes have a lactone skeleton, a pyridine skeleton, a quinazoline skeleton, a bisquinazoline skeleton and the like, and colors are developed by opening the above skeletons (rings).

The developer which can be used is to develop the colors of the leuco dyes and include, for example, inorganic acids, aromatic carboxylic acids and anhydrides or metal salts thereof, organic sulfonic acids, other organic acids, phenolic compounds and the like. Compounds having phenolic hydroxyl groups such as bisphenol A and are particularly preferred.

To be specific, it includes bisphenol A, o-cresol, tertiary butyl catechol, nonylphenol, n-octylphenol, n-dodecylphenol, n-stearylphenol, p-chlorophenol, p-bromophenol, o-phenylphenol, hexafluorobisphenol, n-butyl p-hydroxybenzoate, n-octyl p-hydroxybenzoate, resorcin, dodecyl gallate, 2,2-bis(4'-hydroxyphenyl)propane, 4,4-dihydroxydiphenylsulfone, 1,1-bis(4'-hydroxyphenyl)ethane, 2,2-bis(4'-hydroxy-3-methylphenyl)propane, bis(4-hydroxyphenyl) sulfide, 1-phenyl-1,1-bis(4'-hydroxyphenyflethane, 1,1-bis(4'-hydroxyphenyl)-3-methylbutane, 1,1-bis(4'-hydroxyphenyl)-2-methylpropane, 1,1-bis(4'-hydroxyphenyl)-n-hexane, 1,1-bis(4'-hydroxyphenyl)-n-heptane, 1,1-bis(4'-hydroxyphenyl)-n-octane, 1,1-bis(4'-hydroxyphenyl)-n-nonane, 1,1-bis(4'-hydroxyphenyl)-n-decane, 1,1-bis(4'-hydroxyphenyl)-n-dodecane, 2,2-bis(4'-hydroxyphenyl)butane, 2,2-bis(4'-hydroxyphenyl)ethyl propionate, 2,2-bis(4'-hydroxyphenyl)-4-methylpentane, 2,2-bis(4'-hydroxyphenyl) hexafluoropropane, 2,2-bis(4'-hydroxyphenyl)-n-heptane, 2,2-bis(4'-hydroxyphenyl)-n-nonane and the like. At least one kind of them can be used.

The discoloration temperature controlling agent which can be used is to promote reversibly the reaction between the leuco dye and the developer in a specific temperature region, and it shall not specifically be restricted as long as it is provided with the above function and includes alcohols, esters, ketones, ethers, acid amides, azomethines, fatty acids, hydrocarbons and the like.

To be specific, it includes behenyl alcohol, stearyl alcohol, cetyl alcohol, myristyl alcohol, lauryl alcohol, undecyl alcohol, decyl alcohol, nonyl alcohol, octyl alcohol, hexyl alcohol, neopentyl alcohol, butyl alcohol, methyl alcohol, ethylene glycol, polyethylene glycol, cellosolve, glycerin, pentaerythritol, benzyl alcohol, cyclohexyl alcohol, octyl caprate, decyl caprate, lauryl laurate, myristyl laurate, decyl myristate, lauryl myristate, cetyl myristate, lauryl palmitate, cetyl palmitate, stearyl palmitate, lauryl stearate, cetyl p-t-butylbenzoate, stearyl 4-methoxybenzoate, 4,4'-(hexafluorosopropylidene)bisphenol dilaurate, dilauryl thiodipropionate, dimyristyl thiodipropionate, stearyl benzoate, benzyl stearate, dibenzyl thiodipropionate, distearyl thiodipropionate, benzyl benzoate, trilaurate, triethyl citrate, distearyl phthalate, didecyl adipate, didecyl ether, distearyl ether, distearyl ketone, acetone, acetophenone, stearamide, lauramide, lauryl alcohol.acrylonitrile adducts, stearyl alcohol.acrylonitrile adducts, benzylidene.p-toluidine, benzylidene.butylamine, stearic acid, palmitic acid, lauric acid, cycloparraffin and the like. At least one kind of them can be used.

The microcapsule pigment used in the present invention can be produced by selecting the raw materials for the thermochromic composition comprising at least the leuco dye, the developer and the discoloration temperature controlling agent each described above so that an average particle diameter becomes 0.1 to 1.0 µm and so that a wall film is formed by an amino resin and turning them into a microcapsule.

For example, an interfacial polymerization method, an interfacial polycondensation method, an in situ polymerization method, a submerged curing coating method, a phase separation method from an aqueous solution, a phase separation method from an organic solvent, a melting dispersion cooling method, an air suspension coating method, a spray drying method and the like can be listed as the microencapsulation method, and it can suitably be selected according to the uses.

For example, in the phase separation method from an aqueous solution, the targeted thermochromic microcapsule pigment can be produced by heating and melting the leuco dye, the developer and the discoloration temperature controlling agent, then adding the mixture to an emulsifier solution to disperse it in an oil droplet form by heating and stirring, then gradually adding thereto as a capsule film agent, a resin raw material in which a wall film can be formed by an amino resin, for example, an amino resin solution, to be specific, the respective solutions such as a methylolmelamine aqueous solution, a urea solution and a benzoguanamine solution, subsequently reacting them to prepare a dispersion and then filtrating the above dispersion.

The contents of the leuco dye, the developer and the discoloration temperature controlling agent are varied according to the kinds of the leuco dye, the developer and the discoloration temperature controlling agent used and the microencapsulation method, and they are 0.1 to 100 of the developer and 1 to 100 of the discoloration temperature controlling agent based on 1 of the leuco dye in terms of a mass ratio. Also, a content of the capsule film agent is 0.1 to 1 based on the capsule contents in terms of a mass ratio.

In the microcapsule pigment of the present invention, the colors, the optional developing temperatures and decoloring temperatures of the respective pigments can be set by suitably combining the kinds and the amounts of the leuco dye, the developer and the discoloration temperature controlling agent each described above.

In the microcapsule pigment of the present invention, a wall film has to be formed by an amino resin, and it is formed preferably by, for example, a melamine resin, a urea resin, a benzoguanamine resin and the like, more preferably by the melamine resin in terms of the productivity, the storage stability and the writing property.

When the wall film is formed by a resin other than the amino resin, for example, a urethane resin, an epoxy resin and the like, at least one of the line intensity, the storage stability and the writing property is inferior, and it is not preferred.

A thickness of the wall film in the microcapsule pigment is suitably determined according to required strength of the wall film and the line intensity.

In order to form the wall film by the amino resin, an amino resin raw material (a melamine resin, a urea resin, a benzoguanamine resin and the like), a dispersant, a protective colloid and the like suitable for the respective microencapsulation methods are selected.

An average particle diameter of the microcapsule pigment obtained is preferably 0.1 to 1.0 μm, more preferably 0.2 to 0.9 μm in terms of the coloring property, the developing property, the readily decoloring property and the stability and inhibiting an adverse effect exerted on the writing property. The "average particle diameter" prescribed in the present invention (including the examples and others) is a value obtained by measuring an average particle diameter by means of a particle size distribution measuring apparatus (particle diameter measuring apparatus N4Plus, manufactured by Beckman Coulter, Inc.).

If the above average particle diameter is less than 0.1 μm, the sufficiently high line intensity is not obtained, and on the other hand, if it exceeds 1.0 μm, deterioration of the writing property and reduction in dispersion stability of the microcapsule pigment are brought about, and it is not preferred.

The microcapsule pigment having an average particle diameter falling in the range (0.1 to 1.0 μm) described above can be prepared by suitably combining stirring conditions in producing the microcapsule pigment, though varied depending on the microencapsulation method, in the phase separation method from an aqueous solution.

In the present invention, a content of the microcapsule pigment is preferably 5 to 30% by mass (hereinafter referred to as merely "%"), more preferably 10 to 25% based on the total amount of the ink composition.

If a content of the above colorant (developed particles) is less than 5%, the coloring power and the developing property are unsatisfactory, and on the other hand, if it exceeds 30%, starving is liable to be brought about, and it is not preferred.

The chemical substance used in the present invention is a substance which is a polymer comprising ketone as a main chain and has an acidic functional group in a chemical structure and which has an acid value of 3 to 40 (mgKOH/g), and it exerts functions such as enhancing the line intensity by interaction with the microcapsule pigment contained in the ink.

The chemical substance which can be used is a polymer comprising ketone as a main chain, and the acidic functional group in a chemical structure includes a carboxylic acid group, a phosphoric acid group and the like.

If the above acid value is less than 3 mgKOH/g, starving is liable to be brought about in the writing property, and on the other hand, if it exceeds 40 mgKOH/g, the ink is reduced in stability and liable to generate deposits. Accordingly, both are not preferred. The more preferred acid value is 5 to 15 mgKOH/g.

To be specific, it includes Solsperse 44000 (main chain: ketone, acidic functional group: carboxylic acid, acid value: about 12 mgKOH/g, manufactured by The Lubrizol Corporation), Solsperse 46000 (main chain: ketone, acidic functional group: carboxylic acid, acid value: about 12 mgKOH/g, manufactured by The Lubrizol Corporation) and the like. At least one of them can be used.

A content of the above chemical substance is preferably 0.1 to 10%, more preferably 0.3 to 5% on the total amount of the ink composition.

If a content of the above chemical substance is less than 0.1%, the satisfactory line intensity is not obtained, and the microcapsule pigment is reduced in stability. On the other hand, if it exceeds 10%, starving is liable to be brought about in writing, and it is not preferred.

The polyoxyethylene aliphatic amine (hereinafter referred to as the "POE aliphatic amine") used in the present invention has 10 to 20 carbon atoms in an aliphatic group and exerts functions such as dispersion stabilization of the microcapsule pigment.

If the aliphatic group has less than 10 carbon atoms, adsorbability thereof onto the pigment is deteriorated, and the pigment dispersion effect is unsatisfactory. On the other hand, if the carbon atoms exceed 20, the solubility in water is unsatisfactory, and it is not preferred.

The preferred POE aliphatic amine has a POE addition mole number of preferably 10 to 50, more preferably 10 to 20 in the POE aliphatic amine in terms of solubility in water and the writing property.

The POE aliphatic amine which can be used includes, for example, POE (15) oleylamine and POE (15) stearylamine, and at least one of them can be used.

A content of the above POE aliphatic amines is preferably 0.1 to 10%, more preferably 0.3 to 5% based on the total amount of the ink composition.

If the above content is less than 0.1%, the pigment dispersion effect is unsatisfactory, and on the other hand, if it exceeds 10%, starving is liable to be brought about in writing, and it is not preferred.

The ink composition for an aqueous ink ball point pen of the present invention can suitably contain, in addition to the microcapsule pigment, the chemical substance, the POE aliphatic amine each described above and water which is a solvent (tap water, refined water, distilled water, ion-exchanged water, purified water and the like) as a balance, a water-soluble solvent, a thickener, a lubricant, a rust preventive, an antiseptic agent or a fungicide and the like as long as the effects of the present invention are not damaged.

The water-soluble solvent which can be used includes, for example, glycols such as ethylene glycol, diethylene glycol, triethylene glycol, propylene glycol, polyethylene glycol, 3-butylene glycol, thiodiethylene glycol and glycerin, ethylene glycol monomethyl ether and diethylene glycol monomethyl ether, and they can be used alone or in a mixture.

The thickener which can be used is preferably, for example, at least one selected from the group consisting of synthetic polymers, natural rubber, celluloses and polysaccharides. To be specific, it includes gum arabic, tragacanth gum, guar gum, locust bean gum, alginic acid, carrageenan, gelatin, casein, xanthan gum, dextran, methyl cellulose, ethyl cellulose, hydroxyethyl cellulose, carboxymethyl cellulose, starch glycolic acid and salts thereof, propylene glycol alginate, polyvinyl alcohol, polyvinylpyrrolidone, polyvinyl methyl ether, polyacrylic acid and salts thereof, carboxyvinyl polymers, polyethylene oxide, copolymers of vinyl acetate and polyvinylpyrrolidone, cross-linking type acrylic acid polymers and salts thereof, non-cross-linking type acrylic acid polymers and salts thereof, styrene acrylic acid copolymers and salts thereof and the like.

The lubricant includes nonionic surfactants such as fatty acid esters of polyhydric alcohols which are used for surface treating agents of pigments, higher fatty acid esters of saccharides, polyoxyalkylene higher fatty acid esters and alkylphosphoric acid esters, anionic surfactants such as alkylsulfonic acid salts of higher fatty acid amides and alkylallylsulfonic acid salts, derivatives of polyalkylene glycols and fluorine base surfactants, polyether-modified silicones and the like. Also, the rust preventive includes benzotriazole, tolyltriazole, dicyclohexylammonium nitrite, saponins and the like, and the antiseptic agent or the fungicide includes phenol, sodium Omadine, sodium benzoate, benzimidazole base compounds and the like.

Methods which have so far been known can be employed for producing the ink composition for an aqueous ink ball point pen of the present invention, and it can be obtained, for example, by blending the prescribed amounts of the respective components described above and stirring and mixing them by means of a stirrer such as a homomixer and a disperser. Further, coarse particles contained in the ink composition may be removed, if necessary, by filtration and centrifugal separation.

In the thus constituted ink composition for an aqueous ink ball point pen of the present invention, prepared is the ink containing at least the microcapsule pigment having an average particle diameter of 0.1 to 1.0 μm in which a wall film is formed by an amino resin and the chemical substance which is a polymer comprising ketone as a main chain and has an acidic functional group in a chemical structure and which has an acid value of 3 to 40 (mgKOH/g), and obtained is the ink composition for an aqueous ink ball point pen with which a sufficiently high line intensity is obtained even when a ball point pen loaded with the ink containing the microcapsule pigment having a small average particle diameter is used for writing on paper and the like and which is excellent in storage stability and a writing performance.

It is presumed to be attributable to the following reasons that the sufficiently high line intensity is obtained even when the microcapsule pigment having a small average particle diameter of 0.1 to 1.0 μm is used in the ink composition for an aqueous ink ball point pen of the present invention and that the ink is excellent in storage stability and a writing performance.

That is, in the present invention, the chemical substance described above brings about moderate aggregation to the microcapsule pigment to thereby enhance the line intensity, and the polyoxyethylene aliphatic amine plays a role of keeping the above aggregation state of the pigment stable.

Next, in the aqueous ink ball point pen of the present invention, capable of being employed are general constitutions of ball point pens, for example, various constitutions of ball point pens of a knock type and a non-knock type (cap type) comprising a resin-made ink storing tube equipped with a metal-made tip, the ink composition for an aqueous ink ball point pen of the present invention described above which is charged into the above tube and a writing instrument main body (holder), and it can be produced according to ordinary methods.

In the present invention, the ink composition for an aqueous ink ball point pen having the constitution described above is used, and therefore various constitutions of ball point pens in which an ink follower is loaded are preferably employed.

A very simple method in which when an inorganic thickener such as hydrophobic silica is used, all ink follower components such as a base oil and a surfactant are preliminarily mixed at room temperature and then kneaded by means of a dispersing apparatus such as a roll mill and a kneader can be employed as a production method for the ink follower used in the aqueous ink ball point pen of the present invention. Also, when a polymer which is hard to be dissolved or dispersed at room temperature is added, stirring under heating, kneading under heating and the like can be carried out if necessary. Also, the ink follower produced is further kneaded or heated again by means of a dispersing apparatus such as a roll mill and a kneader, whereby the ink follower can be prepared as well.

In the aqueous ink ball point pen of the present invention thus constituted, the sufficiently high line intensity is obtained even when a ball point pen loaded with the ink composition for an aqueous ink ball point pen having the constitution described above is used for writing on paper since the above ink composition for an aqueous ink ball point pen has the operation effects described above which have not so far been observed, and the ink exerts a function in which storage stability and a writing performance are excellent.

EXAMPLES

Next, the present invention shall be explained in further details with reference to examples and comparative examples, but the present invention shall not be restricted to the examples shown below.

Examples 1 to 8 and Comparative Examples 1 to 2

Preparation of Microcapsule Pigments A-1 to A-6:
Pigment A-1:

Heated and molten were 1 part of a leuco pigment: 6-(dimethylamino)-3,3-bis[4-(dimethylamino)phenyl]-1(3H)-isobenzofranone, 2 parts of a developing substance: bisphenol A and 24 parts of a discoloration temperature controlling agent: 4,4'-(hexafluoroisopropylidene)bisphenol dilaurate, and then the mixture was added to 400 parts of a methyl vinyl ether.maleic anhydride copolymer resin (GANTREZ AN-179: manufacture by GAF CHEMICALS Corporation) aqueous solution which was controlled to 95° C. and a pH of 4 and dispersed therein in an oil droplet form by heating and stirring. Then, 20 parts of a 50% methylolmelamine aqueous solution as a capsule film agent was gradually added thereto, and subsequently they were reacted for 1 hour to prepare a dispersion. A microcapsule pigment was obtained by filtrating the above dispersion. The microcapsule pigment thus prepared had an average particle diameter of 0.3 μm.

Pigment A-2:

A microcapsule pigment having an average particle diameter of 0.6 μm was obtained by changing the stirring condition according to the recipe of the pigment A-1.

Pigment A-3:

A microcapsule pigment having an average particle diameter of 0.9 μm was obtained by changing the stirring condition according to the recipe of the pigment A-1.

Pigment A-4:

Heated and molten were 1 part of the leuco pigment: 6-(dimethylamino)-3,3-bis[4-(dimethylamino)phenyl]-1 (3H)-isobenzofranone, 2 parts of the developing substance: bisphenol A and 24 parts of the discoloration temperature 1.5 controlling agent: 4,4'-(hexafluoroisopropylidene)bisphenol dilaurate, and then the mixture was added to 276 parts of water of 60° C. containing 0.1 part of sodium dodecylbenzenesulfonate while stirring and dispersed therein in an oil droplet form. Further, a solution prepared by adding 17 parts of formalin (formaldehyde 37% aqueous solution) and 73 parts of water to 10 parts of urea was added to the solution described above which was dispersed in an oil droplet form and controlled to 80° C., and then 5 parts of an acetic acid 20% aqueous solution was added thereto to react them for 2 hours. A microcapsule pigment was obtained by filtrating the above dispersion. The microcapsule pigment thus prepared had an average particle diameter of 0.8 μm.

Pigment A-5:

Heated and molten were 1 part of the leuco pigment: 6-(dimethylamino)-3,3-bis[4-(dimethylamino)phenyl]-1 (3H)-isobenzofranone, 2 parts of the developing substance: bisphenol A, 24 parts of the discoloration temperature controlling agent: 4,4'-(hexafluoroisopropylidene)bisphenol dilaurate and 5 parts of isocyanate (MR-200: manufacture by Nippon Polyurethane Industry Co., Ltd.), and then the mixture was added to 400 parts of an aqueous solution of 60° C. containing 2 parts of tricalcium phosphate and 0.04 part of sodium dodecylbenzenesulfonate and dispersed therein in an oil droplet form by heating and stirring. Then, 2 parts of 1.5 xylylenediamine was dropwise added thereto and stirred at 60° C. for about 3 hours to terminate the reaction, and then the reaction liquid was subjected to hydrochloric acid treatment. A microcapsule pigment was obtained by filtrating the above dispersion. The microcapsule pigment thus prepared had an average particle diameter of 0.8 μm.

Pigment A-6:

Heated and molten were 1 part of the leuco pigment: 6-(dimethylamino)-3,3-bis[4-(dimethylamino)phenyl]-1 (3H)-isobenzofranone, 2 parts of the developing substance: bisphenol A, 24 parts of the discoloration temperature controlling agent: 4,4'-(hexafluoroisopropylidene)bisphenol dilaurate and an epoxy resin (jER 828: manufacture by Japan Epoxy Resin Co., Ltd.), and then the mixture was added to 400 parts of a methyl vinyl ether.maleic anhydride copolymer resin (GANTREZ AN-179: manufacture by GAF CHEMICALS Corporation) aqueous solution which was controlled to 95° C. and a pH of 4 and dispersed therein in an oil droplet form by heating and stirring. Then, 3 parts of an amine base curing agent (jER U: manufacture by Japan Epoxy Resin Co., Ltd.) was added thereto, and subsequently they were reacted for 4 hours. A microcapsule pigment was obtained by filtrating the above dispersion. The microcapsule pigment thus prepared had an average particle diameter of 0.6 μm.

Preparation of Inks:

The respective aqueous ink compositions for an aqueous ink ball point pen were prepared by an ordinary method according to recipes (microcapsule pigments: A-1 to A-6, amines: triethanolamine and B-1 to B-3, the thickener, the rust preventive, the antiseptic agent, the fungicide, the solvent and water) shown in the following Table 1.

Preparation of Aqueous Ink Ball Point Pens:

The respective aqueous ink compositions obtained above were used to prepare aqueous ink ball point pens. To be specific, used were a holder of a ball point pen (trade name: Signo UM-100, manufacture by Mitsubishi Pencil Company, Ltd.) and a refill comprising a polypropylene-made ink storing tube having an inner diameter of 3.8 mm and a length of 113 mm, a stainless-made tip (cemented carbide ball, ball diameter: 0.5 mm) and a joint connecting the above storing tube and the tip. The respective inks described above were charged into the refill and an ink follower comprising a mineral oil as a principal component was mounted at a rear end of the ink to prepare aqueous ink ball point pens.

The aqueous ink ball point pens obtained in Examples 1 to 8 and Comparative Examples 1 to 3 were used to evaluate line intensity, storage stability and a writing property by the respective evaluation methods described below. The results thereof are shown in Table 1.

Evaluation Method of Line Intensity:

The respective pen bodies were used to write spiral lines on writing paper according to an ISO standard by a free hand, and the line intensity thereof were visually evaluated according to the following criteria.

Evaluation Criteria:

◯: sufficiently high line intensity as compared with line intensity obtained by the inks which were not blended with the chemical substances of the present invention.

Δ: high line intensity as compared with line intensity obtained by the inks which were not blended with the chemical substances of the present invention.

X: same or lower line intensity as compared with line intensity obtained by the inks which were not blended with the chemical substances of the present invention.

Evaluation Method of Storage Stability:

A glass-made bottle of 15 ml equipped with a cap was charged with the respective inks obtained and tightly sealed, and then it was stored under a condition of 50° C. for 3 months. Then, the states of the respective inks were visually observed and evaluated according to the following criteria.

Evaluation Criteria:

◯: separation and aggregation were not brought about.

Δ: slight separation or aggregation was brought about.

X: separation or aggregation was brought about.

Evaluation Method of Writing Property:

The respective pen bodies were used to write spiral lines on writing paper according to an ISO standard by a free hand, and the writing properties thereof were visually evaluated according to the following criteria.

Evaluation Criteria:

◯: writable without bringing about starving.

Δ: starving was partially brought about.

X: starving was wholly brought about to a large extent.

TABLE 1

|  |  | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|---|
| Microcapsule pigment | A-1 | 15 |  |  |  | 15 |  |  |  |  |  |  |
|  | A-2 |  | 15 |  |  |  | 15 |  |  |  | 15 |  |
|  | A-3 |  |  | 15 |  |  |  | 15 |  |  |  |  |
|  | A-4 |  |  |  | 15 |  |  |  | 15 |  |  |  |
|  | A-5 |  |  |  |  |  |  |  |  | 15 |  |  |
|  | A-6 |  |  |  |  |  |  |  |  |  |  | 15 |
| Chemical substance | B-1 *1 | 1 |  | 1 |  | 1 |  | 1 |  | 1 |  |  |
|  | B-2 *2 |  | 1 |  | 1 |  | 1 |  | 1 |  | 1 |  |
| Amines | Triethanolamine |  |  |  |  | 1 |  |  |  |  |  |  |
|  | POE (15) oleylamine | 1 |  |  | 1 |  |  | 1 |  |  | 1 |  |
|  | POE (15) stearylamine |  | 1 | 1 |  |  | 1 |  | 1 | 1 |  | 1 |
| Thickener | Xanthan gum *3 | 0.3 | 0.3 | 0.3 | 0.3 | 0.3 | 0.3 | 0.3 | 0.3 | 0.3 | 0.3 | 0.3 |
| Rust preventive | Benzotriazole | 0.3 | 0.3 | 0.3 | 0.3 | 0.3 | 0.3 | 0.3 | 0.3 | 0.3 | 0.3 | 0.3 |
| Antiseptic agent | Benzoisothiazoline & others *4 | 0.3 | 0.3 | 0.3 | 0.3 | 0.3 | 0.3 | 0.3 | 0.3 | 0.3 | 0.3 | 0.3 |
| Solvent | Glycerin | 10 | 10 | 10 | 10 | 10 | 10 | 10 | 10 | 10 | 10 | 10 |
| Water |  | Balance | Balance | Balance | Balance | Balance | Balance | Balance | Balance | Balance | Balance | Balance |
| Evaluation | Line intensity | Δ | ○ | ○ | ○ | Δ | ○ | ○ | ○ | X | X | X |
|  | Storage stability | ○ | ○ | ○ | ○ | Δ | ○ | ○ | ○ | Δ | Δ | ○ |
|  | Writing property | ○ | ○ | ○ | ○ | ○ | ○ | ○ | ○ | Δ | Δ | ○ |

A-1: melamine resin 0.3 μm
A-2: melamine resin 0.6 μm
A-3: melamine resin 0.9 μm
A-4: urea resin 0.8 μm
A-5: urethane resin 0.8 μm
A-6: epoxy resin 0.6 μm
*1: Solsperse 44000 (manufactured by The Lubrizol Corporation)
*2: Solsperse 46000 (manufactured by The Lubrizol Corporation)
*3: KELZAN S (manufactured by Sansho Co., Ltd.)
*4: Bioden 421 (Daiwa Chemical Industry Co., Ltd.)

As apparent from the results shown in Table 1, it has become clear that in Examples 1 to 8 which fall in the scope of the present invention, the line intensity, the storage stability and the writing property are excellent as compared with Comparative Examples 1 to 3 which fall outside the scope of the present invention.

In contrast with this, it has been found that in Comparative Examples 1 to 2, the microcapsule pigment having an average particle diameter controlled to 0.1 to 1.0 μm is used, but the wall film is formed by a urethane resin and an epoxy resin other than the amino resin, so that the targeted effects can not be exerted and that in Comparative Example 3, the microcapsule pigment of the present invention is used, but the chemical substance of the present invention comprising a polymer containing ketone as a main chain is not contained, so that the targeted effects can not be exerted.

INDUSTRIAL APPLICABILITY

Even when the microcapsule pigment having an average particle diameter controlled to 0.1 to 1.0 μm is used, the excellent line intensity which has not so far been observed is obtained, and the storage stability and the writing property are excellent as well, so that the ink composition of the present invention is most suited to an ink composition for an aqueous ink ball point pen and an aqueous ink ball point pen.

The invention claimed is:

1. An ink composition for an aqueous ink ball point pen containing at least a microcapsule pigment which has an average particle diameter of 0.1 to 1.0 μm and in which a wall film is formed by an amino resin and a chemical substance which is a polymer comprising ketone as a main chain and has an acidic functional group in the chemical structure and which has an acid value of 3 to 40 (mgKOH/g).

2. The ink composition for an aqueous ink ball point pen as described in claim 1, further containing polyoxyethylene aliphatic amine (an aliphatic group has 10 to 20 carbon atoms).

3. An aqueous ink ball point pen filled with the ink composition for an aqueous ink ball point pen as described in claim 2.

4. The ink composition for an aqueous ink ball point pen as described in claim 2, wherein polyoxyethylene in the polyoxyethylene aliphatic amine described above has an addition mole number of 10 to 50.

5. An aqueous ink ball point pen filled with the ink composition for an aqueous ink ball point pen as described in claim 4.

6. An aqueous ink ball point pen filled with the ink composition for an aqueous ink ball point pen as described in claim 1.

* * * * *